United States Patent [19]

Curchod et al.

[11] 3,995,498
[45] Dec. 7, 1976

[54] WHEEL MOUNTING ASSEMBLY FOR TIRE BALANCING MACHINE

[75] Inventors: Donald B. Curchod; Wilhelm Borner, both of Santa Clara, Calif.

[73] Assignee: Norton Corporation, Mountain View, Calif.

[22] Filed: May 13, 1975

[21] Appl. No.: 577,034

[52] U.S. Cl. .................................. 73/480; 73/487; 74/440; 74/449

[51] Int. Cl.$^2$ .................. G01M 1/04; F16H 55/12; F16H 55/18

[58] Field of Search ............ 73/487, 480, 482, 483, 73/485, 486; 144/288 A; 157/1.24; 74/409, 440, 445, 449, 461

[56] References Cited

UNITED STATES PATENTS

| | | | |
|---|---|---|---|
| 1,977,297 | 10/1934 | Weaver | 73/480 X |
| 2,493,872 | 1/1950 | Henry | 73/483 |
| 3,580,320 | 5/1971 | Roberts | 73/487 X |

FOREIGN PATENTS OR APPLICATIONS

| | | | |
|---|---|---|---|
| 1,195,071 | 6/1965 | Germany | 73/487 |

Primary Examiner—James J. Gill
Attorney, Agent, or Firm—Flehr, Hohbach, Test, Albritton & Herbert

[57] ABSTRACT

A wheel mounting assembly for a tire balancing machine of a type for rotating a wheel with a tire mounted thereon includes an annular support plate arranged to be mounted for rotation by the machine. The support plate carries means for simultaneously moving a plurality of studs uniformly between first and second radial positions defined about the axis of rotation of the support plate. The foregoing means includes a central gear disposed on the axis of rotation of the support plate. A plurality of satellite gears corresponding in number to the number of the studs needed for support of a given wheel are disposed about the axis of rotation of the plate in engagement with the central gear. The studs are carried on means supported from each satellite gear so as to revolve about the axis of rotation of the satellite gears whereby rotation of one of the satellite gears serves to rotate the others to the same degree via the central gear so as to move all studs simultaneously from the first to the second position.

9 Claims, 11 Drawing Figures

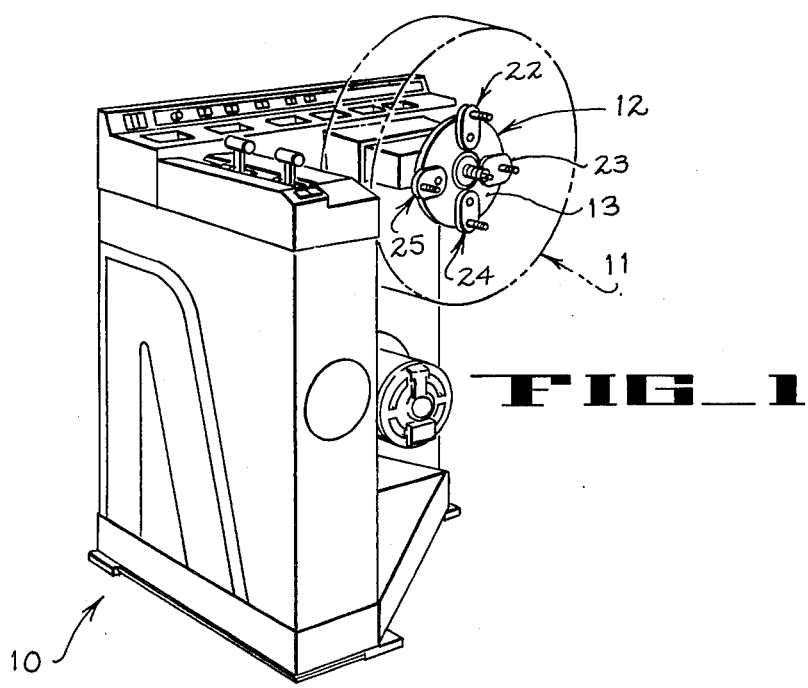
FIG_1
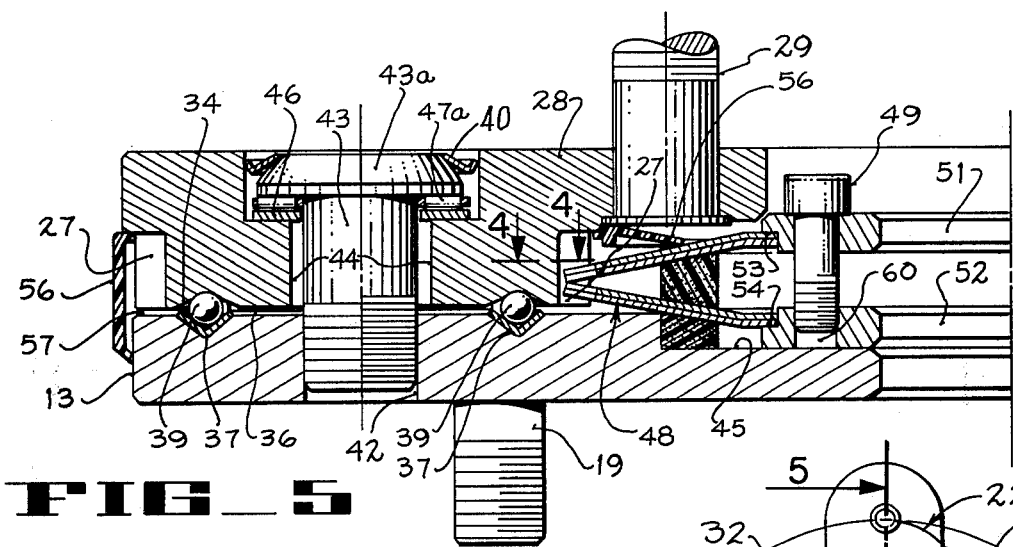
FIG_5
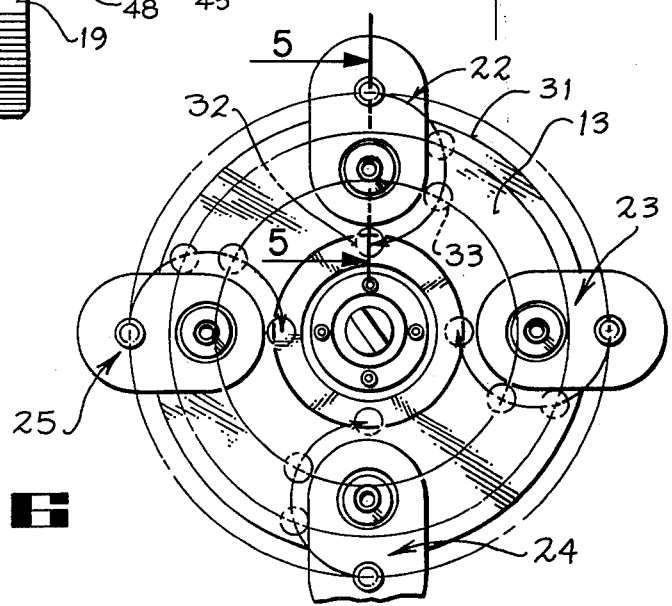
FIG_6

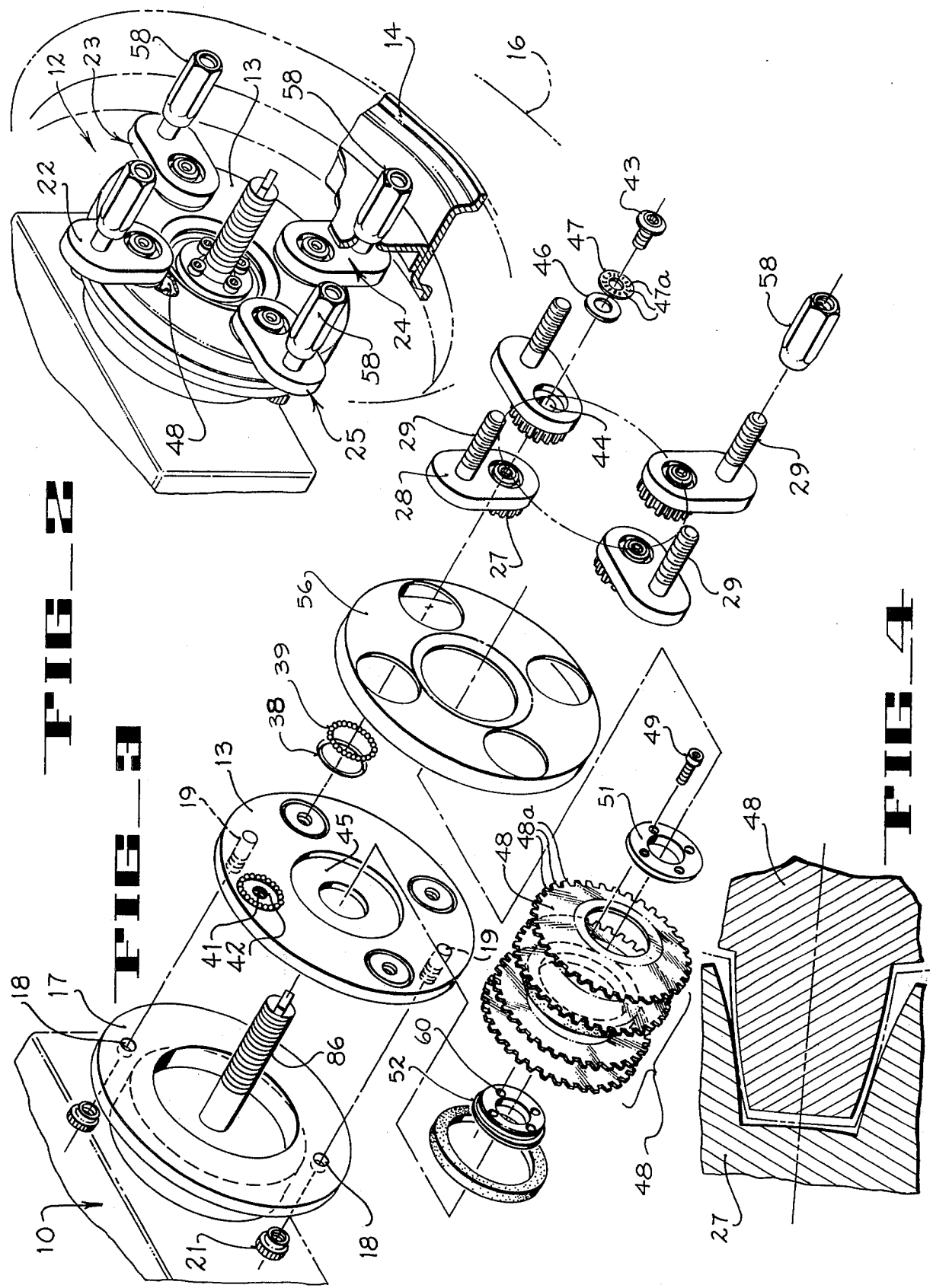

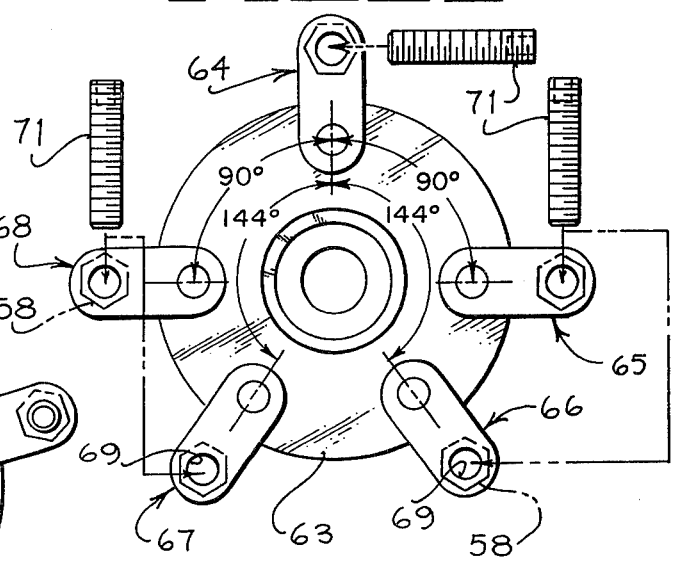
FIG_8
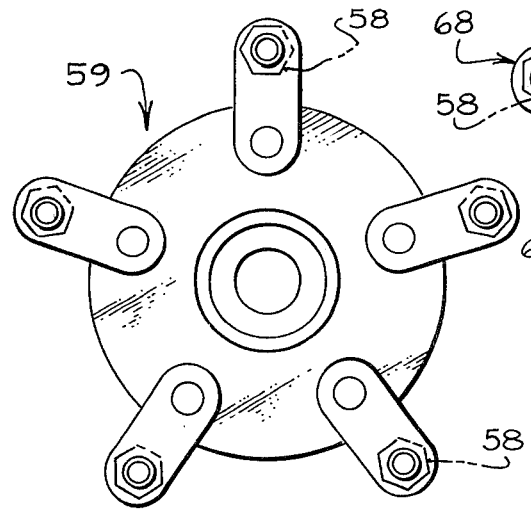
FIG_7
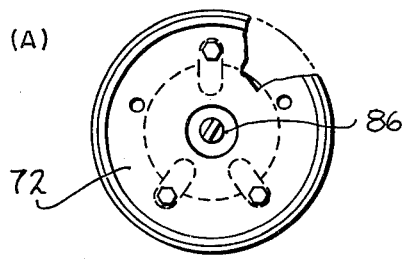
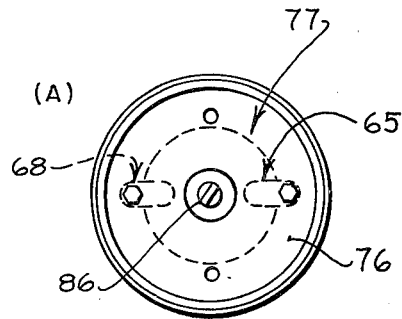
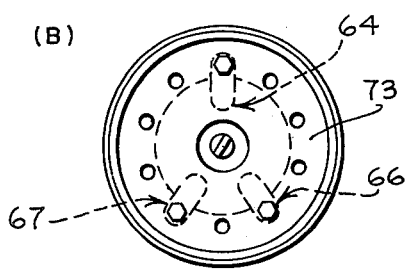
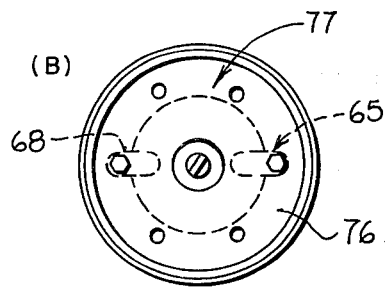
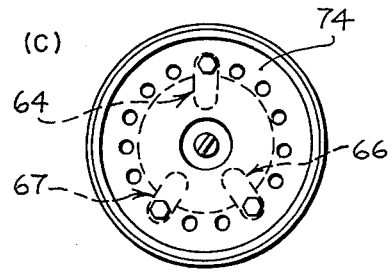
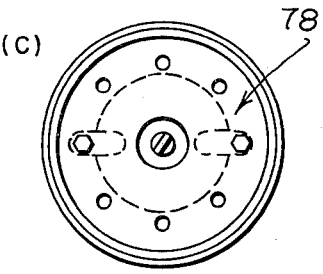
FIG_9
FIG_10

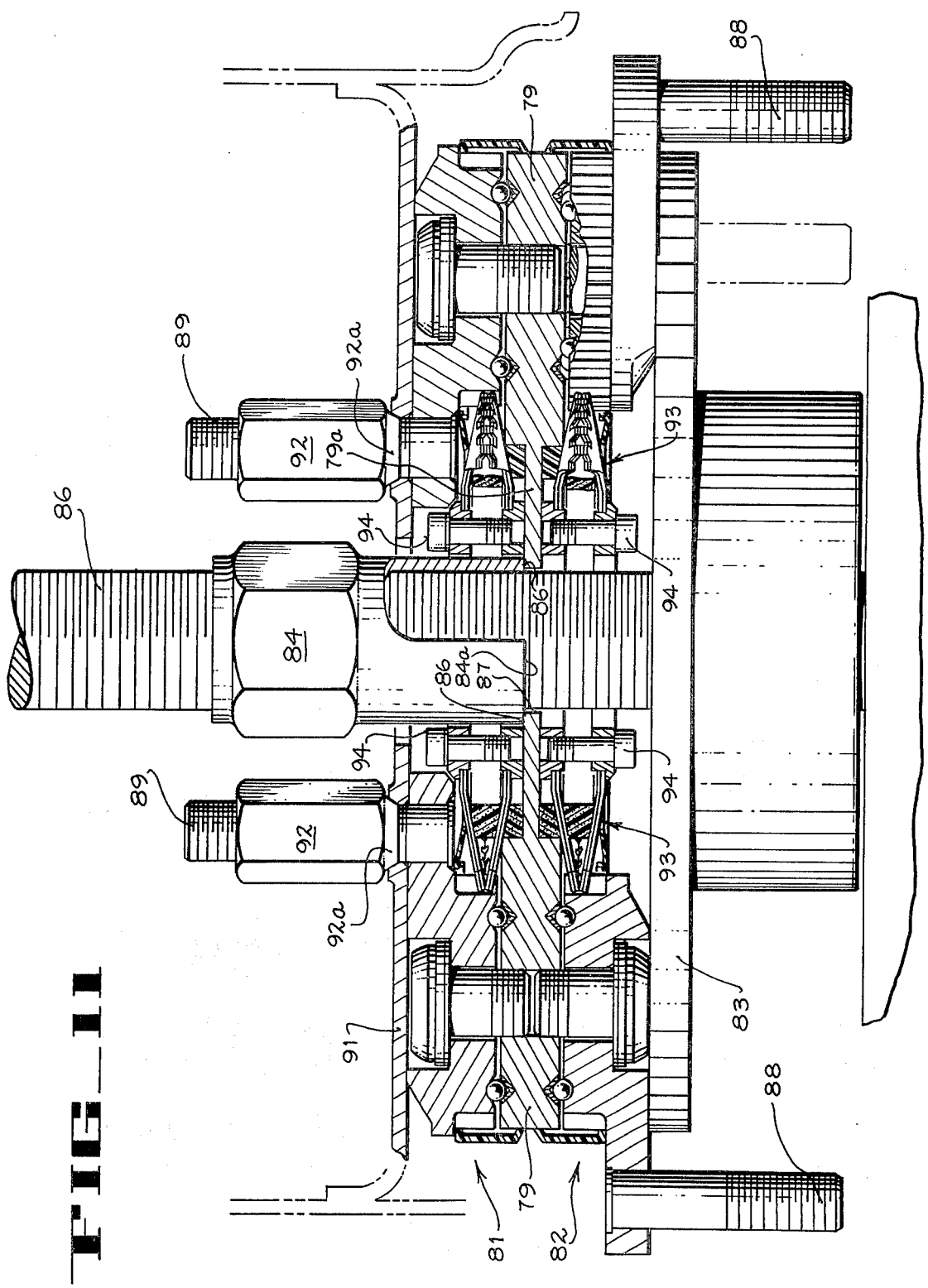

WHEEL MOUNTING ASSEMBLY FOR TIRE BALANCING MACHINE

BACKGROUND OF THE INVENTION

This invention pertains to a wheel mounting assembly for supporting a wheel with a tire mounted thereon during handling for balancing of the tire combination or for changing tires on the wheel.

Heretofore, and in view of the fact that all automotive wheels do not contain the same number of mounting stud openings, it has been required to provide individual support plates for each given style and type of wheel so as to accommodate wheels with different numbers of openings from any given standard as well as to permit wheels to be mounted for balancing where the stud openings are located at a greater or lesser radius than standard. As an alternative to maintaining a lrage inventory of such assemblies, one suggestion has been to provide an assembly with individually movable mounting studs each of which moves independently of the others so that any combination of mounting hole positions can be engaged. Such an assembly has been observed to be quite difficult to manage when attempting to mount the wheel thereon. Thus, there is a need for an improved mounting assembly of the kind described.

In addition to the above, it should be relatively evident that in a machine of the type described for rotating a wheel and a tire mounted thereon for purposes of balancing the combination of tire and wheel, the tolerances among the various portions of the movable parts must be as close as possible commensurate with costs and performance to obtain an accurately balanced combination wheel and tire. Thus, if a tire and wheel combination as mounted moves on the assembly, the balancing usually will be inaccurately achieved.

Accordingly, it has been desirable to obtain a rotatable wheel mounting device of the kind described in which lost motion is substantially eliminated.

SUMMARY OF THE INVENTION AND OBJECTS

In general, there has been provided a machine for rotating a wheel with a tire mounted thereon for balancing the wheel and tire combination including a support plate designed and adapted to be supported for rotation while carrying the wheel and tire combination. A plurality of wheel mounting studs are carried upon the support plate by means for simultaneously moving the studs uniformly between first and second radial positions defined about the axis of rotation of the support plate. The last named means includes a central gear disposed on the axis of rotation of the support plate and a plurality of satellite gears corresponding in number to the number of wheel mounting studs needed to mount the wheel. The satellite gears are disposed about the axis of rotation in engagement with the central gear. Each carries means for supporting one of the studs therefrom so as to rotate with the satellite gear supporting same. Thus, rotation of one of the gears serves to rotate the others to the same degree via the central gear and move the studs from their first to their second positions.

Accordingly to a particularly preferred embodiment, the central gear expands and contracts radially of its axis of rotation so as to provide complete and full engagement of the satellite gears in response to force applied axially thereto.

In general, it is an object of the present invention to provide an improved means for mounting a whel and tire combination to be rotated for balancing.

It is another object of the present invention to provide an improved mounting assembly for the foregoing type in which clearance and lost motion among the gears is substantially eliminated.

It is a further object of the present invention to provide an improved wheel and tire mounting assembly in which wheels having non-standard numbers and positions of holes can be readily mounted.

It is another object of the invention to provide an assembly for mounting a wheel and tire combination in which at least two groups of satellite gears can be employed on the same side of a rotatable mounting plate for use in conjunction with mounting wheels having an even number of mounting stud holes, whereas the othe group can be employed to support for rotation a wheel having mounting stud holes in multiples of five.

The foregoing and other objects of the invention will become more readily evident from the following detailed description of preferred embodiments when considered in conjunction with the drawings.

BRIEF DESCRIPTION OF THE DRAWINGS

FIG. 1 shows a perspective view of a machine for balancing a tire and wheel combination incorporating a mounting assembly according to the invention;

FIG. 2 shows an enlarged detail perspective view of a mounting plate assembly supporting a wheel thereon in accordance with the invention;

FIG. 3 shows an exploded perspective view of the assembly of FIG. 2.

FIG. 4 shows an enlarged detail section view taken along the line 4—4 of FIG. 5;

FIG. 5 shows an enlarged elevation section view taken along the line 5—5 of FIG. 6 when the rotatable satellite assembly 22 has been moved to the phantom line position 32;

FIG. 6 shows an enlarged elevation view of a wheel and tire mounting assembly as shown in FIG. 2;

FIG. 7 shows a wheel and tire mounting assembly for mounting wheels formed with five mounting holes;

FIG. 8 shows a wheel and tire mounting assembly for mounting wheels having an even number of holes as well as having five holes and multiples of five holes therein;

FIG. 9 shows a diagram illustrative of the mounting of wheels formed with five, ten and fifteen holes respectively in views 9A, 9B, 9C;

FIG. 10 shows a diagram illustrative of the mounting of wheels formed with even numbers of holes, such as four, six and eight as shown respectively in views 10A, 10B, 10C; and FIG. 11 shows another embodiment of the invention in which a plurality of groups of satellites have been employed on opposite sides of a support plate in which one of the groups of satellites includes an even number of satellites, and the other group includes an odd number of satellites and in which the section line for a portion of the view has been rotated to facilitate description of the overall apparatus.

DETAILED DESCRIPTION OF PREFERRED EMBODIMENTS

The machine 10, as currently sold, includes a number of controls and means for rotating a wheel and tire combination while determining the exact locations and amounts of imbalances in the wheel-tie combination 11. Further disclosure of the manner of operation for determination of the location of these imbalances is not believed necessary in light of the fact that the present invention is not directed to that particular aspect of this type of equipment. However, the machine 10 does include a wheel and tire mounting assembly 12 whereby the stud receiving holes of a wheel can be engaged by studs of assembly 12 for rotation at great speed.

Assembly 12 herein includes a support plate 13 designed and adapted to be supported for rotation to carry the wheel and tire combination. Thus, a wheel 14 carries a tire 16 whereby the combination is to be balanced.

Machine 10 includes a rotatable drive flange 17 formed to include a pair of mounting holes 18 having a slightly larger diameter than the threaded studs 19 protruding through and beyond the rear surface of flange 17. A threaded sleeve nut 21 threadedly engages the inserted threaded end of studs 19 so as to draw support plate 13 tightly to rotatable drive flange 17 in coplanar relation.

A plurality of satellite assemblies 22, 23, 24 and 25 are each constructed in substantially the same way and, accordingly, only one of the satellite assemblies will be described herein. Accordingly, satellite assembly 22 includes a satellite gear 27 coupled to rotate with a support arm 28 carrying a threaded mounting stud 29 fixed thereto, or as appearing in a further embodiment below, releasably attached to the arms 28. Preferably, gear 27 and arm 28 can be formed in a unitary style or even in the integral manner as shown in the drawing.

The term "arm" 28 as used herein and in the claims is intended to include any axis defined between an off-set mounted stud 29 and the axis of rotation of the gear 27 supporting the stud. For example, this could be achieved by a circular top portion or other stud support means carried by gear 27 when the stud 29 is mounted thereon but off-set from the axis of rotation of gear 27 so as to form a "lever arm " or axis defined between stud 29 and the axis of gear 27.

Each satellite gear assembly 22–25 is disposed and mounted for rotation about an axis disposed at a common radial displacement from the axis of rotation of plate 13 and at equal angles on the plate with respect to a predetermined one of the axes of rotation of the satellite gears, such as satellite gear 22.

Accordingly, each staellite assembly 22–25 is arranged to rotate about an axis of rotation defined through plate 13 and to dispose studs 29 at a selected number of positions as desired, such as positions 31, 32, 33, etc. about the axis of rotation of the satellite. Means for supporting each satellite assembly 22–25 for rotation on the face of support plate 13 comprises a ball bearing race 34 formed on a surface 36 confronting plate 13. A corresponding race 37 formed on support plate 13 is disposed in alignment with race 34 and preferably carries a hardened loosely disposed annular race element 38 seated therein for reasons as will be explained further below. Ball bearings 39 ride between the two races 34, 37.

Means for holding satellite gear 27 to plate 13 in a manner serving to permit gear 27 and arm 28 to adjust laterally with respect to the axis of rotation thereof permits bearing means, such as the balls 39 and the bearing races 34, 37, to align the satellite gear 27 with respect to its axis of rotation.

Accordingly, threads 41 formed on the interior of a hole 42 engage the end of a threaded bolt 43 formed with lock threads for holding assembly 22 coupled to plate 13 and for rotation thereon. This, bolt 43 extends through an opening 44 drilled through arm 28 and having sufficient clearance on both sides of bolt 43 for arm 28 and gear 27 to rotate therearound while permitting limited lateral adjustments.

In order to permit such lateral movement, however, a washer 46 and annular bearing element 47 are interposed beneath the cap portion 43a of bolt 43 and a shoulder formed around opening 44. Bearing element 47 comprises primarily a washer-like structure containing a number of small rotatable bearing elements 47a so as to permit lateral sliding movement of the head 43a of bolt 43 on the surface of bearing element 47.

From the foregoing, it will be readily evident that the manner of attaching each satellite gear 27 to plate 13 serves to permit gear 27 to move laterally with respect to the axis of rotation thereof so as to permit the bearings and ball bearing races to accurately align the satellite gear 27 with respect to its own asis of rotation in response to tightening bolt 43.

Each of the holes 42 is disposed at a common radial displacement from the axis of rotation of plate 13 and disposed equiangularly on plate 13 with respect to a predetermined one of the axes of rotation of satellite gears 27.

A central gear or gear assembly 48 disposed on the axis of rotation of plate 13 and seated in the well 45 engages each of the satellite gears 27 and simultaneously rotates them upon rotation of the central gear. In the foregoing manner, rotation of one of the satellite gears 27 serves to move all of the wheel mounting studs 29 between first and second positions lying on concentric circles about the axis of rotation of plate 13.

Central gear assembly 48 expands and contracts radially of the axis of rotation of plate 13 upon application of longitudinal forces applied by the bolts 49 to cause the teeth of gear 48 to "fully" engage the teeth of gears 27. The foregoing term is meant in the sense of removing substantially all clearance between the teeth of gears 48 and 27 consistent with permitting the gears to rotate.

Accordingly, assembly 48 includes at least a pair of gears and, as shown in FIG. 5, a pair of pairs of gears dished centrally thereof and disposed in confronting relation with the teeth thereof 48a being mutually aligned for engaging the teeth of the satellite gears 27. Means (now to be described) to compress the gears axially of the axis of rotation of plate 13 so as to radially enlarge the diameter of the gear 48 and "fully" engage the teeth of satellite gears 27, is shown in phantom lines in FIG. 4. Thus, bolts 49 extend freely through a first annular web 51 and then threadedly engage an opening 60 in a second annular web 52. The two webs 51, 52 are each formed with confronting annular shoulders 53, 54 respectively, for engaging the inner edge margin of the central opening formed within the pairs of confronting pairs of gears 48.

In addition to the above, a pliable plastic dust cover 56 surrounds and overlaps the spacing 57 between gear 27 and plate 13 which would otherwise be exposed. Accordingly, cover 56 prevents dust, dirt, grit and the like from entering into spacing 57 at the periphery of plate 13. Also, on its inner edge the cover 56 serves to ride upon the central gear assembly 48 so as to preclude entry of dirt into the device at that location as well.

Sealing is further improved by inserting resilient annular seal rings 50, 55 for precluding entry of harmful dirt, grit, etc.

In operation, mounting assembly 12 is arranged in order to accommodate with relative ease wheels formed with mounting stud openings disposed at non-standard radial positions from the axis of rotation of the wheel as well as at a standard radial position. Accordingly, the radial positions of each of the wheel mounting studs 29 can be easily adjusted radially merely by using any of studs 29 to rotate its associated gear 27 and, hence, drive central gear assembly 48 thereby moving each of the other satellite gears 27 to an equal degree. Thereafter, when a tire and wheel have been mounted upon studs 29, the usual attaching nuts 58 are applied to the studs to retain a wheel to assembly 12.

The mounting assembly described above included four satellite assemblies carrying four studs. However, wheels are employed which include 3, 4, 5, 6, 8 and 10 holes. One of the most widely used wheels has five holes. Thus, another assembly 59 as shown diagrammatically in FIG. 7 could be employed. However, provision of an inventory of mounting assemblies so as to accommodate all manner of wheels having non-standard numbers of holes would pose a significant economic problem.

To minimize this problem, another embodiment as shown in FIG. 8 has been provided whereby wheels having an even number of holes or a number corresponding to multiples of five can be mounted from the same side of assembly 61, using one or the other of two groups of satellite assemblies.

Thus, as shown diagrammatically in FIG. 8, assembly 61 includes an annular mounting plate 63 adapted to be supported for rotation about its own axis of rotation and carrying five satellite assemblies 64–68 of a type as described above with respect to satellites 22–25. Accordingly, satellites 64–68 each are mounted about a pivot point off-set from the axis of rotation of assembly 61 and positively positioned radially of the axis of rotation of assembly 61 by means of a gear (not shown) comparable to gear 48 described above and engaging each of the satellites.

In addition, each satellite assembly 64–68 is formed to include threaded sockets, such as 69, whereby mounting studs 71 can be readily disposed into such sockets 69 so that different pluralities of the five satellites shown in FIG. 8 can be employed for mounting wheels thereon having either multiples of five holes therein or an even number of holes. The nuts 70 are shown in phantom lines on all the mounting studs 75 only to indicate their location as selected since it should be clear that all five nuts 70 could not be used at the same time.

Finally with respect to the construction shown and represented by FIG. 8, the axis of rotation of assemblies 66 and 67 are equiangularly disposed from the axis of rotation of assembly 64 in the amount of 144°. The reason for this is based on the fact that adjacent holes in a five-hole wheel are disposed 72° apart and the mounting studs provided for assemblies 64, 66 and 67 can then be employed to support wheels 72, 73, 74 respectively having five, ten and fifteen mounting holes formed therein, since each of the wheels 72, 73, 74 includes a group of three holes located at positions as in wheel 72.

On the other hand, when it is desired to mount a wheel having an even number of holes, this can be accomplished by supporting the wheel from a different group of satellites, such as the pair 65 and 68, located on a diameter of support plate 63.

Thus, as shown in FIG. 10A, a four-hole wheel 76 is supported upon arms associated with satellites 65, 68 whereas in FIGS. 10B and 10C, six- and eight-hole wheels 77, 78 respectively are shown mounted on the same satellites 65, 68.

Accordingly, assembly 61 includes two pluralities or groups of satellites wherein one plurality of satellites has been disposed to support wheels of a type having mounting holes in multiples of two and another plurality of satellites serves to support wheels of a type having mounting holes in multiples of five and in which both pluralities of satellites are carried on a common side of support plate 63.

According to another embodiment, a single support plate carries two groups of satellites on opposite faces of a common support plate. Each group has a different number of satellites and mounting studs. In this manner, one or the other of the two groups of satellites can be used by simply disposing the assembly with the preferred number of satellites in position to receive a wheel and tire combination. Since a great number of all wheels have four or five mounting holes in them, a mounting assembly for four or five holes has been provided on the opposite sides of a mounting plate 79 flanked on opposite sides by wheel mounting assemblies 81 and 82 of a type as generally described above. A drive flange 83 corresponding to drive flange 17 in the embodiment described at the outset above frictionally engages the confronting surfaces of assembly 82 disposed tightly in contact therewith for rotation with flange 83. The large sleeve nut 84 threadedly enages a support post 86 located at the center of drive flange 83 for rotation therewith. Accordingly, the inner end edge 84a of nut 84 engages the inner marginal surface 86 defined about the opening 87 formed in the middle of plate 79. The thickness of plate 79 has been reduced in its central position to provide little more than a web portion 79a in view of the fact that both sides of plate 79 include a recessed well cpmparable to well 45 as in FIG. 3 and FIG. 5.

As thus arranged, nut 84 engages surface 86 to cause plate 79 to be driven toward drive flange 83 whereby secure frictional engagement of the surface portions of assembly 82 will cause both assemblies 81, 82 to rotate together with flange 83.

In disposing the wheel mounting assemblies 81, 82 onto post 86, mounting studs 88 of wheel mounting assembly 82 are moved to their maximum radial position in order to easily clear the external periphery of flange 83.

Then nut 84 is tightened tightly against the web 79a so as to tightly urge the entire embodiment against the face of flange 83. At that point, studs 89 are moved on their respective support arms so as to align them with the holes of a wheel 91 so that wheel 91 can be readily disposed onto studs 89. Subsequently, the beveled end 92a of tightening nuts 92 engages a conical surface disposed about each of the holes through which studs 89 extend and the tightening nuts 92 serve to seat the wheel 91 firmly onto assembly 81.

It is to be noted above that bolts 49 of the embodiment shown in FIGS. 1 through 6 and bolts 94 are employed to apply an axial force in squeezing together the confronting portions of a radially expansible gear assembly 48 (in the case of the embodiment in FIGS. 1 through 6) and 93 (in the case of the embodiment in FIG. 11). The adjustment of the bolts 94 and 49 is generally intended to be handled by service personnel in order to fix the axial compression on the confronting portions of gear assemblies 48 and 39. Accordingly, it is not intended that these bolts should be adjusted with any great regularity, although this could be possible if it were desired.

The remaining portions and elements of the embodiment shown in FIG. 11 are believed relatively evident from the previous description pertaining to the embodiments shown in FIGS. 1 through 6 and, accordingly, is not believed necessary to be described further at this point.

Finally, as with the earlier described embodiment, both the embodiment of FIG. 8 and of FIG. 11 are pre-balanced by selectively removing material from these embodiments as by drilling selected holes into same.

While the mounting assembly embodiments described above have been described in the environment of a balancing machine 10, it should be readily evident that such assemblies have additional application in conjunction with tire changing machines of a type requiring a wheel and tire combination to be placed thereon and retained as the tire is removed from the wheel and replaced by another.

What is claimed is:

1. A wheel mounting assembly comprising a support plate designed and adapted to be supported for rotation while carrying a wheel and tire combination, a plurality of wheel mounting studs, means carried by said plate and associated with said studs for simultaneously moving said studs uniformly between first and second radial positions defined about the axis of rotation of said support plate, the last named means including a central gear disposed on the axis of rotation of the support plate, a plurality of satellite gears corresponding in number to the number of said studs and disposed about said axis of rotation in engagement with said central gear, a plurality of stud support means each mounting one of said studs therefrom and coupled to rotate with an associated one of said satellite gears whereby rotation of one of said stud support means rotates the others to the same degree via said central gear to move said studs from said first to said second position bearing means disposed between said plate and said stud support means, and means releasably engaging said plate for tightening said stud support means against said bearing means in varying degree to remove substantially all clearance between said stud support means and said bearing means and between said plate and said bearing means consistent with permitting the gears to be rotated while so disposed.

2. A wheel mounting assembly comprising a support plate designed and adapted to be supported for rotation while carrying a wheel and tire combination, a plurality of wheel mounting studs, means carried by said plate and associated with said studs for simultaneously moving said studs uniformly between first and second radial positions defined about the axis of rotation of said support plate, the last named means including a central gear disposed on the axis of rotation of the support plate, a plurality of satellite gears corresponding in number to the number of said studs and disposed about said axis of rotation in engagement with said central gear, a plurality of stud support means each mounting one of said studs therefrom and coupled to rotate with an associated one of said satellite gears whereby rotation of one of said stud support means rotates the others to the same degree via said central gear to move said studs from said first to said second position, bearing means disposed between said plate and said stud support means, and means for drawing said stud support means toward said plate sufficiently tightly to remove substantially all clearance between said stud support means and said bearing means and between said plate and said bearing means consistent with permitting the gears to be rotated while so disposed, said central gear including a central web portion and teeth formed around the periphery of the gear so as to lie in an imaginary plane, not including said web portion, and means for urging said web portion toward said plane to move said teeth radially outwardly to expand the diameter of said gear, to fully engage said satellite gears upon expansion of said central gear.

3. A wheel mounting assembly comprising a support plate designed and adapted to be supported for rotation while carrying a wheel and tire combination, a plurality of wheel mounting studs, means carried by said plate and associated with said studs uniformly between first and second radial positions defined about the axis of rotation of said support plate, the last named means including a central gear disposed on the axis of rotation of the support plate, a plurality of satellite gears corresponding in number to the number of said studs and disposed about said axis of rotation in engagement with said central gear, a plurality of stud support means each mounting one of said studs therefrom and coupled to rotate with an associated one of said satellite gears whereby rotation of one of said stud support means rotates the others to the same degree via said central gear to move said studs from said first to said second position, bearing means disposed between said plate and said stud support means, and means for drawing said stud support means toward said plate sufficiently tightly to remove substantially all clearance between said stud support means and said bearing means and between said plate and said bearing means consistent with permitting the gears to be rotated while so disposed, said central gear including a pair of gear elements disposed in confronting relation, each said element including a central web portion and teeth formed around the periphery of the element so as to lie in an imaginary plane common to the teeth of the other said element, said web portions lying in spaced relation to each other, and means for urging said web portions relatively toward said plane to move said teeth radially outwardly in response thereto to fully engage said satellite gears.

4. In a machine for rotating a wheel with a tire mounted thereon for balancing the wheel and tire combination, a wheel mounting assembly comprising a support plate designed and adapted to be supported for rotation while carrying the wheel and tire combination, a plurality of satellite gears carried by said plate and mounted for rotation at a common radial displacement for the axis of rotation of said plate, central gear means disposed on the first named said axis of rotation for engaging and simultaneously rotating said satellite gears upon rotation of said central gear means, means for radially expanding the diameter of said central gear means in response to application of force to said gear means in a direction generally parallel to said axis of rotation, means for applying said force, a support arm carried by each satellite gear for rotation therewith and wheel mounting studs carried by said arms to rotate therewith about the axis of rotation of the satellite upon rotation of one of the satellite gears to move said studs between first and second positions lying on concentric circles about the axis of rotation of said plate.

5. In a machine for rotating a wheel with a tire mounted thereon for balancing the wheel and tire combination, a wheel mounting assembly comprising a support plate designed and adapted to be supported for rotation while carrying the wheel and tire combination, gear means disposed centrally of said plate for rotation about the axis of rotation of the plate, first and second pluralities of satellite gears carried on opposite sides of said plate respectively and mounted for engagement by the first named said gear means, a support arm carried by each satellite gear for rotation therewith, wheel mounted studs carried by said arms to move therewith about the axis of rotation of its associated satellite, means for readily removably mounting said studs to one or the other of said pluralities of said arms to permit a wheel to be mounted on said studs of a selected one of said pluralities, the first named gear means including means for expanding and contracting the periphery thereof radially of said axis of rotation of said plate in response to force applied axially thereto or relieved therefrom.

6. A wheel mounted assembly comprising a support plate designed and adapted to be supported for rotation while carrying a wheel and tire combination, a plurality of wheel mounting studs, means carried by said plate and associated with said studs for simultaneously moving said studs uniformly between first and second radial positions defined about the axis of rotation of said support plate, the last named means including a central gear disposed on the axis of rotation of the support plate, a plurality of satellite gears corresponding in number to the number of said studs and disposed about said axis of rotation in engagement with said central gear, a plurality of stud support means each mounting one of said studs therefrom and coupled to rotate with an associated one of said satellite gears whereby rotation of one of said stud support means rotates the others to the same degree via said central gear to move said studs from said first to said second position, said central gear being formed and disposed to expand and contract radially of said axis of rotation to fully engage said satellite gears upon expansion of said central gear, said central gear comprising a pair of gears dished centrally thereof and disposed in confronting relation, the teeth of said pair of gears being mutually aligned for engaging the teeth of the satellite gears, and means for compressing said gears axially to the axis of rotation of said plate to radially enlarge the diameter of said gears for removing substantially all clearance between the teeth of the central gear and said satellite gears consistent with permitting the gears to rotate.

7. A wheel mounting assembly comprising a support plate designed and adapted to be supported for rotation while carrying a wheel and tire combination, a plurality of wheel mounting studs, means carried by said plate and associated with said studs for simultaneously moving said studs uniformly between first and second radial positions defined about the axis of rotation of said support plate, the last named means including a central gear disposed on the axis of rotation of the support plate, a plurality of satellite gears corresponding in number to the number of said studs and disposed about said axis of rotation in engagement with said central gear, a plurality of stud support means each mounting one of said studs therefrom and coupled to rotate with an associated one of said satellite gears whereby rotation of one of said stud support means rotates the others to the same degree via said central gear to move said studs from said first to said second position bearing means disposed between said plate and said stud support means, and means for drawing said stud support means toward said plate sufficiently tightly to remove substantially all clearance between said stud support means and said bearing means and between said plate and said bearing means consistent with permitting the gears to be rotated while so disposed, said bearing means including a ball bearing race formed in a surface of each satellite gear in confronting relation to said plate, corresponding races formed in said support plate each in substantial alignment with an associated one of the races in said gears, ball bearing means interposed between said aligned races to maintain said satellite gears in alignment, means for holding each said satellite gear to its associated said ball bearing race serving to permit each said satellite gear to rotate and to move laterally into accurate alignment with respect to the axis of rotation thereof so as to cause said bearing means and races to align said satellite gear accurately with respect to its own axis of rotation a dust cover of pliable material surrounding and overlaying a portion of said plate and said satellite gear teeth to prevent entry of contamination into said bearing means, the inner edge margin overlying said central gear insliding contact relation thereto.

8. In a machine according to claim 7 comprising an annular liner of V-shaped cross-section disposed in at least one of said races to receive said ball bearing means and serving to protect said plate or said satellite gear against inordinate wear.

9. In a machine for rotating a wheel with a tire mounted thereon for balancing the wheel and tire combination a wheel mounting assembly comprising a support plate designed and adapted to be supported for rotation while carrying the wheel and tire combination, a plurality of satellite assemblies disposed about the axis of rotation of said plate and rotatable at fixed positions therearound on said plate, wheel mounting means carried by each said satellite assembly to move around the axis of rotation of its associated satellite while off-set therefrom, and means for simultaneously rotating a plurality of said satellite to move their associated studs between first and second radial positions relative to the axis of rotation of said plate, the last named means including a central gear having teeth formed around the periphery thereof to lie in an imaginary plane for engaging gear teeth associated with each said satellite assembly, said central gear having a web portion spaced from said plane, and means for urging said web portion toward said plane to move said teeth radially outwardly to expand the diameter of said central gear.

* * * * *